United States Patent [19]

Teramachi

[11] Patent Number: 4,769,565

[45] Date of Patent: Sep. 6, 1988

[54] LINEAR MOTOR-DRIVEN TABLE APPARATUS CAPABLE OF OPERATING BOTH IN FINE-FEED AND LARGE-FEED MODES

[76] Inventor: Hiroshi Teramachi, 2-34-8, Higashi-Tamagawa, Setagaya-Ku, Tokyo, Japan

[21] Appl. No.: 868,475

[22] Filed: May 30, 1986

[51] Int. Cl.$^4$ ................. H02K 41/02; F16C 29/06
[52] U.S. Cl. ................................. 310/12; 310/90; 384/45; 318/38
[58] Field of Search ..................... 310/12–14, 310/166, 90; 384/43, 45; 318/37, 38

[56] References Cited

U.S. PATENT DOCUMENTS

| | | | |
|---|---|---|---|
| 3,268,747 | 8/1966 | Snowdou | 310/13 |
| 3,716,731 | 2/1973 | Nilsson | 310/13 |
| 3,881,139 | 4/1975 | Inaba et al. | 310/12 |
| 4,489,990 | 12/1984 | Teramachi | 384/43 |
| 4,667,139 | 5/1987 | Hirai et al. | 310/13 |

Primary Examiner—Patrick R. Salce
Assistant Examiner—D. Rebsch
Attorney, Agent, or Firm—Pennie & Edmonds

[57] ABSTRACT

A linear motor-driven table apparatus capable of operating both in fine-feed mode and large-feed mode has a base, an intermediate carriage received in a longitudinal recess in the base and supported movably by linear bearings fitting on both opposing walls of the recess, and a table body received in a longitudinal recess in the intermediate carriage and movably supported through linear bearings fitting on both opposing walls of the recess. The movement of the intermediate carriage with respect to the base is effected by a first linear motor acting therebetween, while the movement of the table body with respect to the intermediate carriage is effected by a second linear motor acting therebetween. The amount of feed is controlled by controlling the supply of pulses to these linear motors.

1 Claim, 11 Drawing Sheets

LINEAR MOTOR-DRIVEN TABLE APPARATUS CAPABLE OF OPERATING BOTH IN FINE-FEED AND LARGE-FEED MODES

BACKGROUND OF THE INVENTION

1. Field of the Invention

The present invention relates to a table apparatus employing linear motors as driving means and capable of operating both in fine-feed mode and large-feed mode.

2. Description of the Prior Art

The present inventor has already proposed a table apparatus having the following features, in the specification of Japanese Patent Appliciation No. 198803/1983 which was filed in advance of the present application but not laid-open yet. Briefly, this table apparatus has a movable table movably supported through linear bearings on a track member which in turn is mounted on a stationary bed. The stationary bed carries, rotatably but not axially movably, a ball screw shaft which in turn carries, through steel balls, a ball nut for free movement both in the rotational and axial directions. The ball nut is suitably connected to the movable table. A ball spline shaft is rotatably mounted on the stationary bed, in the vicinity of the ball screw shaft, and an outer sleeve is splined, through the intermediary of steel balls, to the ball spline shaft for rotation therewith and for axial movement thereon.

The outer sleeve is operatively connected to the ball nut through a suitable connecting mechanism. The ball screw shaft and the ball spline shaft are driven by respective rotary motors, so that the speed of feed of the movable table is varied from fine feed speed to large feed speed in a stepped manner by a suitable selection of the direction of operation of the rotary motors.

This table apparatus employing the ball screw and nut assembly and the ball spline assembly, however, suffers from a problem in that the response of movement of the movable table is impaired, to make it difficult to precisely control the position of the movable table, due to undesirable twisting of the screw shaft and the spline shaft by the driving torque and also due to the presence of small backlash or play inevitably existing between the screw shaft and the nut and between the spline shaft and the outer sleeve.

In addition, the moving table carrying heavy parts such as the ball screw and nut assembly and the ball spline assembly exhibits a large inertia which undesirably impairs the starting and stopping response characteristics.

It is to be pointed out also that the size of the table apparatus as a whole is increased because of the necessity of the spaces for mounting the rotary motors, ball screw and nut assembly and the ball spline assembly.

SUMMARY OF THE INVENTION

Accordingly, a primary object of the invention is to provide a compact linear motor-driven table apparatus capable of making fine-feed, as well as large-feed, wherein the weight of movable parts is reduced by elimination of the ball screw and nut assembly and the spline assembly, thereby improving the starting and stopping response characteristics, and thus attaining a remarkable improvement in the precision in the position control of the movable table.

To this end, according to the present invention, there is provided a linear motor-driven table apparatus capable of operating both in fine-feed mode and large-feed mode, the apparatus comprising: a base having an upper surface formed therein with a first recess extending in a longitudinal direction over the whole length of the base; linear bearings secured to opposite walls of the recess extending parallel to each other; an intermediate carriage carried on the base through the linear bearings, such that the intermediate carriage is relatively movable with respect to the base, the intermediate carriage having an upper surface formed therein with a second recess extending in the direction of movement of the intermediate carriage over the whole length of the intermediate carriage; linear bearings secured to opposite walls of the second recess extending parallel to each other; a table body relatively movable with respect to the intermediate carriage in the same direction of the movement of the intermediate carriage; the apparatus further comprising a first linear motor means acting between the base and the intermediate carriage, and a second linear motor means acting between the intermediate carriage and the table body; said first linear motor including a first fixed member secured to the underside surface of the intermediate carriage and extending in the longitudinal direction of the intermediate carriage and a first movable member secured to the upper side surface of the base so as to oppose the first fixed member; said second linear motor including a second fixed member secured to the upper side surface of the intermediate carriage and extending in the longitudinal direction of the intermediate carriage, and a second movable member secured to the lower side surface of the table body so as to oppose the second fixed member, the first fixed member and the second fixed member having respective teeth arranged at different pitches from each other.

The above and other objects, features and advantages of the invention will become clear from the following description of the preferred embodiments, when the same is read in conjunction with the accompanying drawings.

DESCRIPTION OF THE PREFERRED EMBODIMENTS

A preferred embodiment of the linear motor-driven table apparatus, capable of making fine feed and large feed, will be explained hereinunder with reference to the accompanying drawings.

Figure 1:
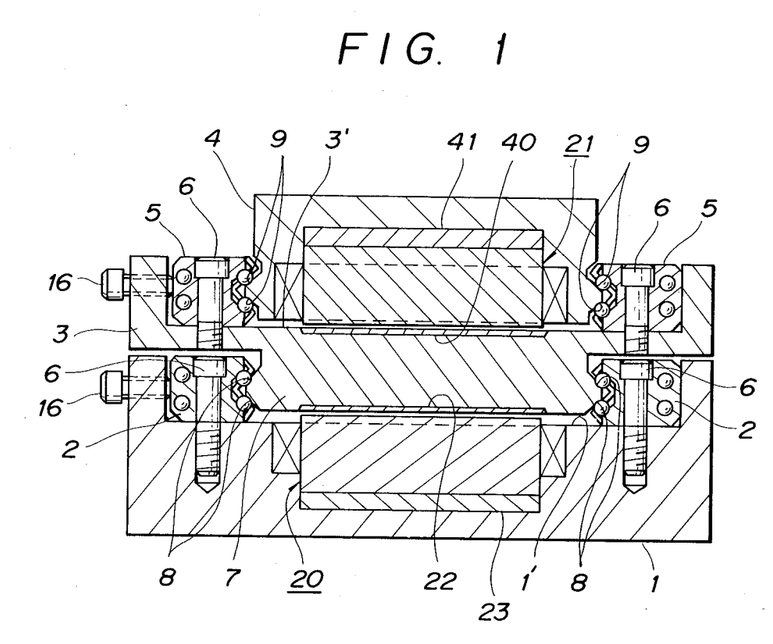
FIG. 1 is a sectional front elevational view of the whole part of an embodiment of a linear motor-driven table apparatus in accordance with the invention.
Figure 2:
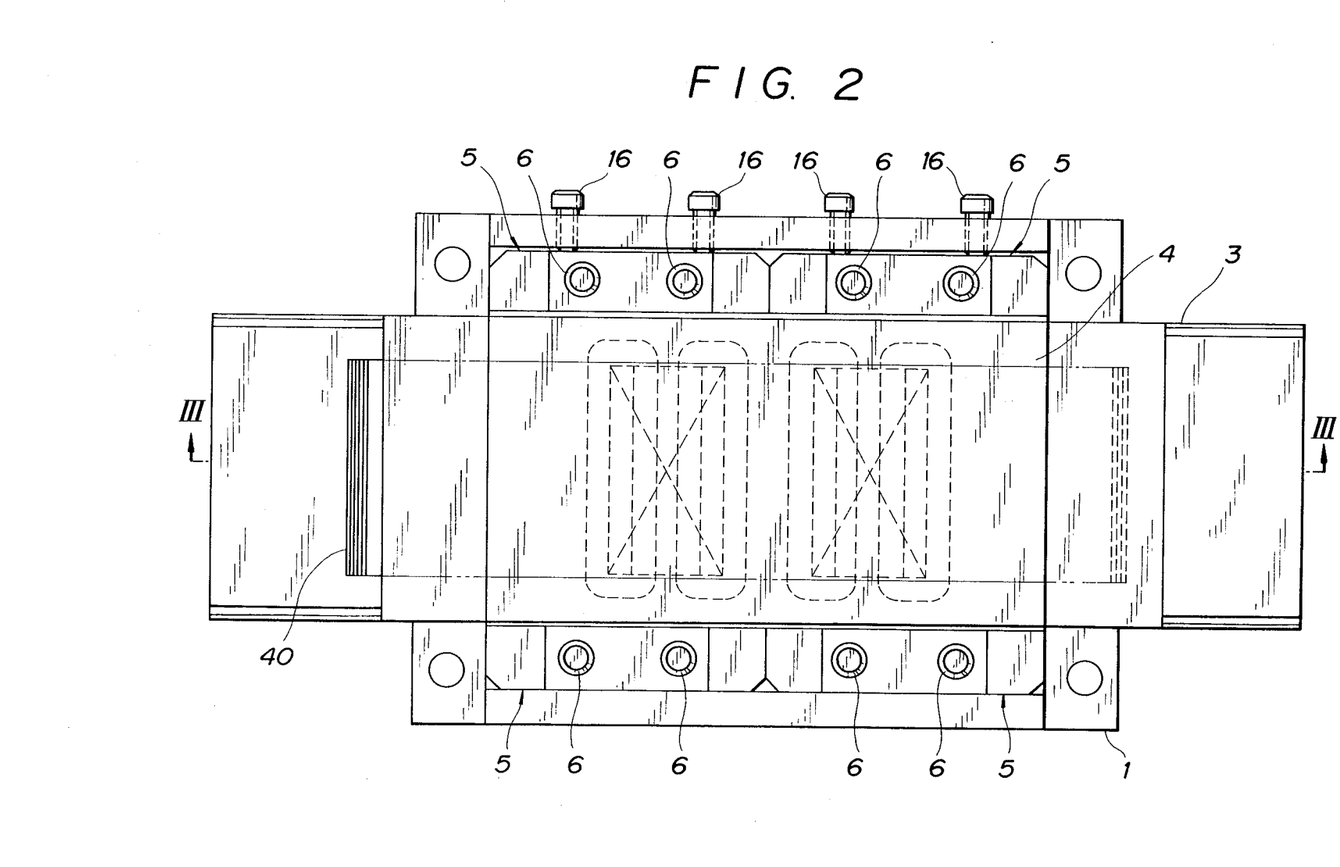
FIG. 2 is a plan view of the apparatus of FIG. 1 rotated through an angle of 90°.
Figure 3:
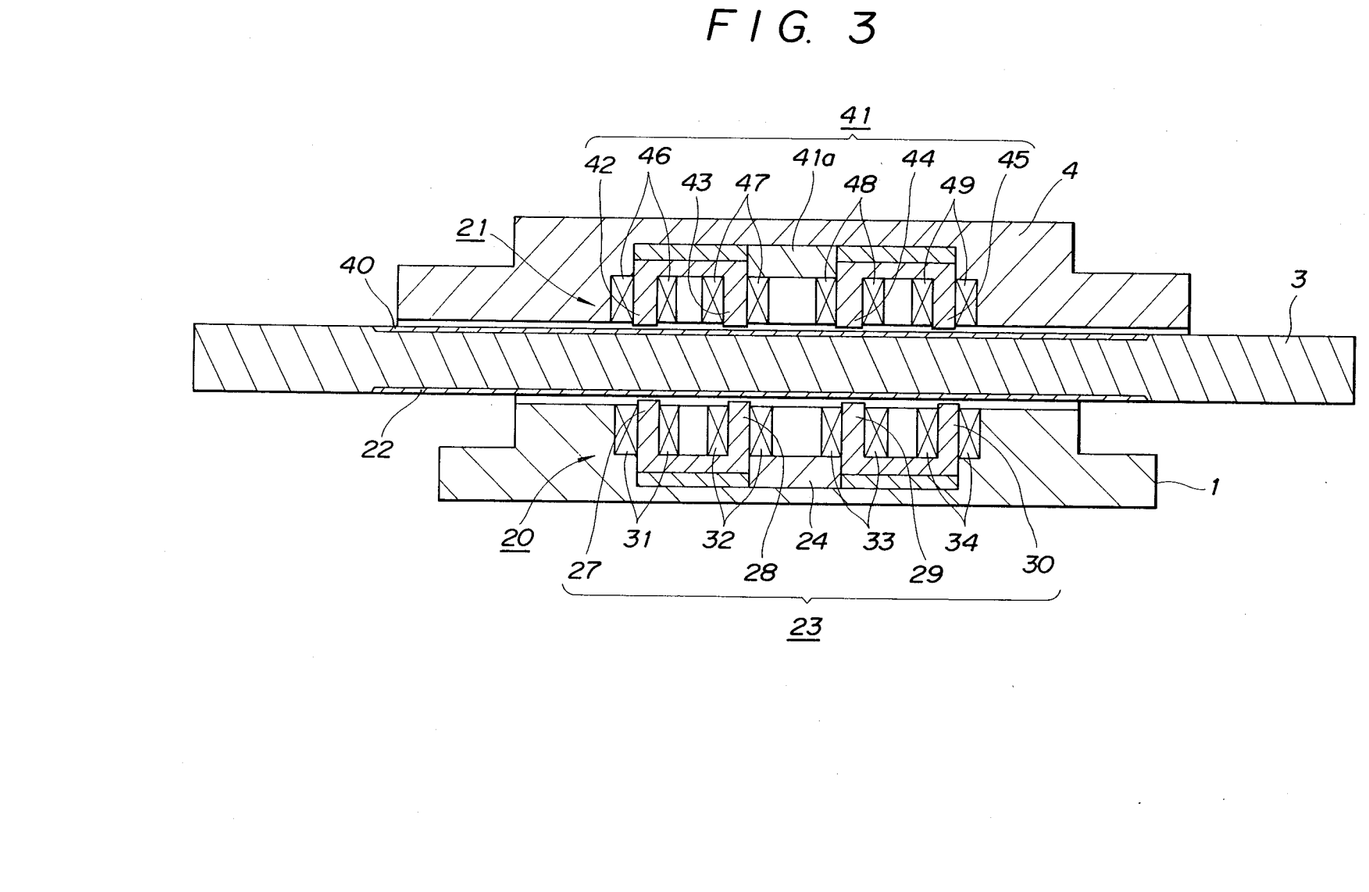
FIG. 3 is a sectional view taken along the line III—III of FIG. 2.

FIGS. 1 to 22 show an embodiment of the invention. Referring first to FIGS. 1 to 3 showing the whole arrangement of the the linear motor-driven table apparatus, a base 1 is adapted to be fixed to a suitable stationary foundation such as a bed which is not shown. The base 1 has an upper side surface formed therein with a recess 1' extending in the longitudinal direction thereof. A left pair of linear bearings 2, 2 and a right pair of linear bearings 2, 2 are secured to opposite walls of the recess 1' which extend parallel with each other. An intermediate carriage 3 is carried by the base 1 for relative movement with respect to the base 1, through intermediary pairs of linear bearings 2,2 and 2,2. The intermediate carriage 3 has an upper side surface formed therein with a recess 3' extending in the direction of the movement thereof over the whole length thereof. A table body 4 is mounted on the intermediate carriage 3 through the intermediary of a left pair of linear bearings 5,5 and a right pair of linear bearings 5,5, which are secured to opposite walls of the recess 3' extending parallel with each other, such as to be able to move in the same direction as the intermediate carriage 3 and relatively with respect to the carriage 3.

Figure 4:
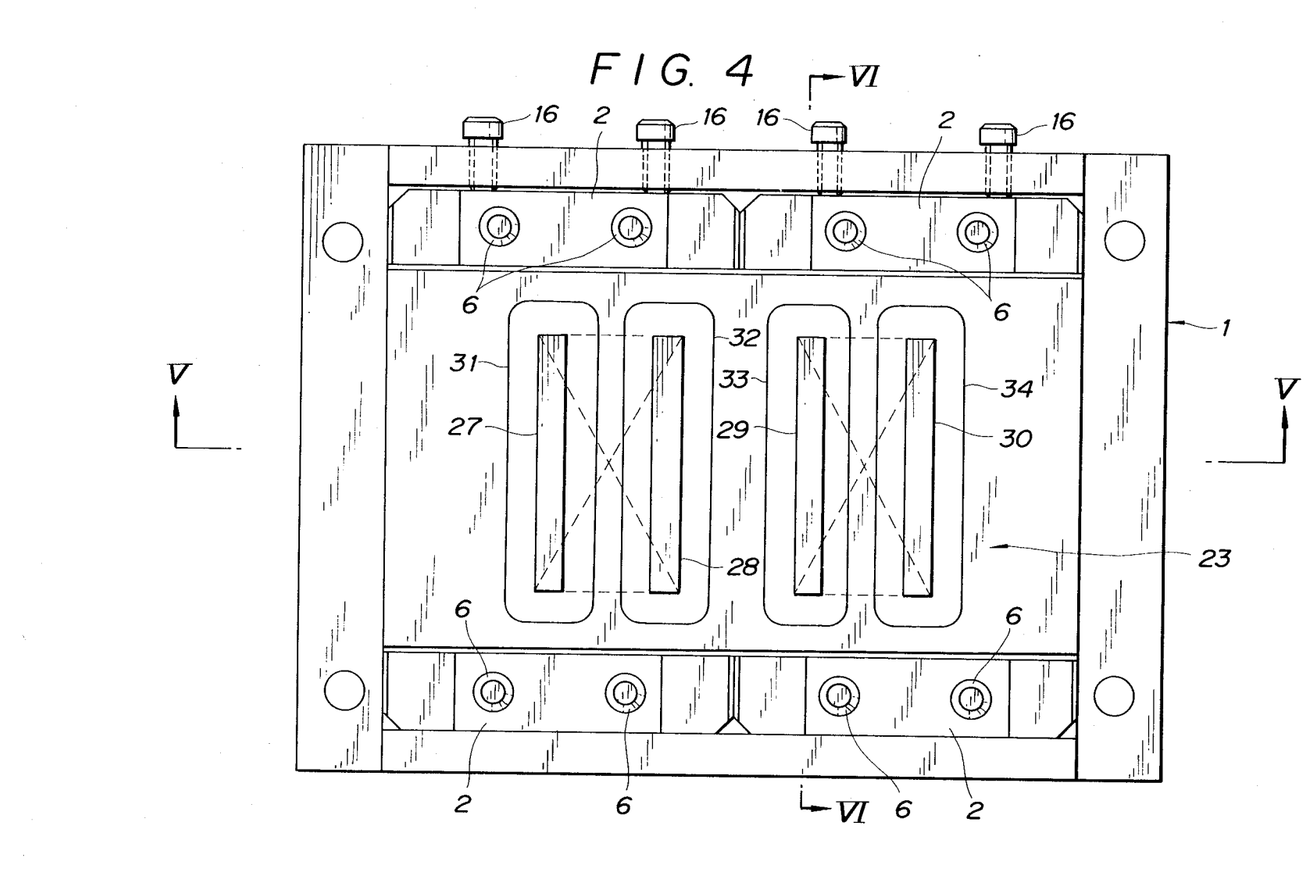
FIG. 4 is a plan view of a base incorporated in the embodiment.
Figure 5:
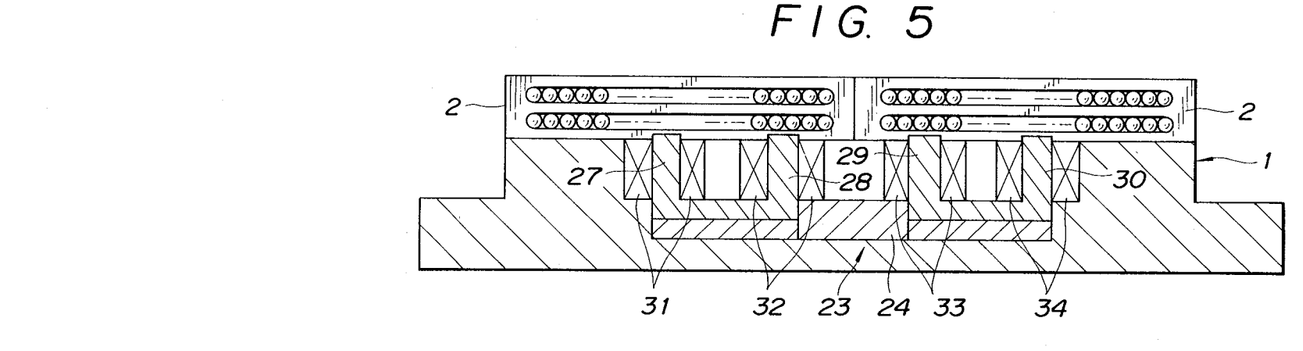
FIG. 5 is a sectional view taken along the line V—V of FIG. 4.
Figure 6:
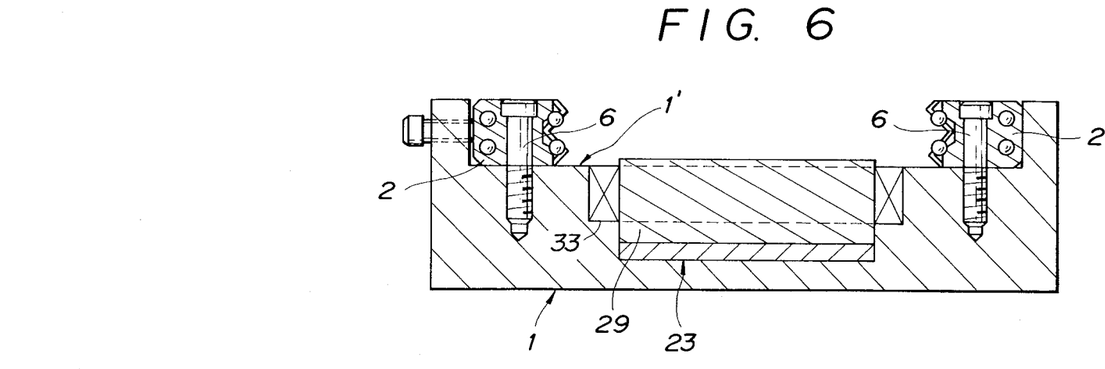
FIG. 6 is a sectional view taken along the line VI—VI of FIG. 4.
Figure 7:
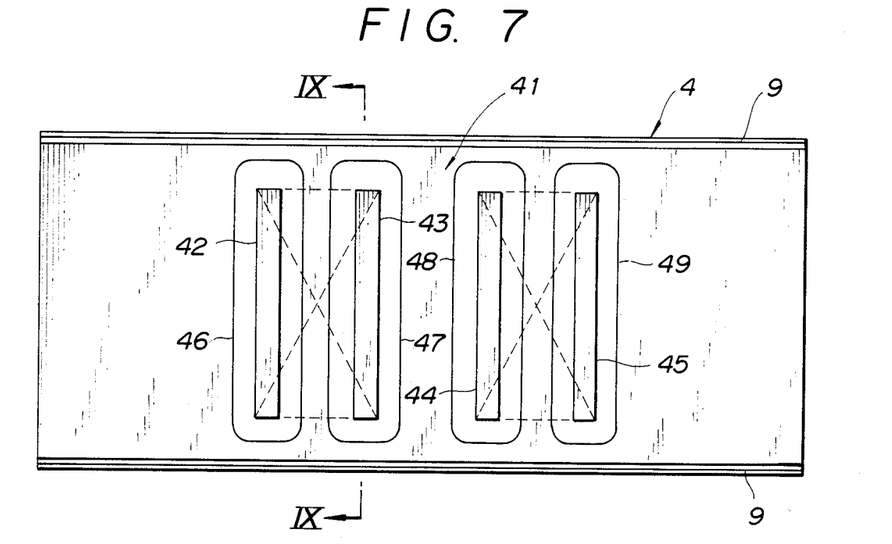
FIG. 7 is a bottom plan view of table body incorporated in the embodiment.
Figure 8:
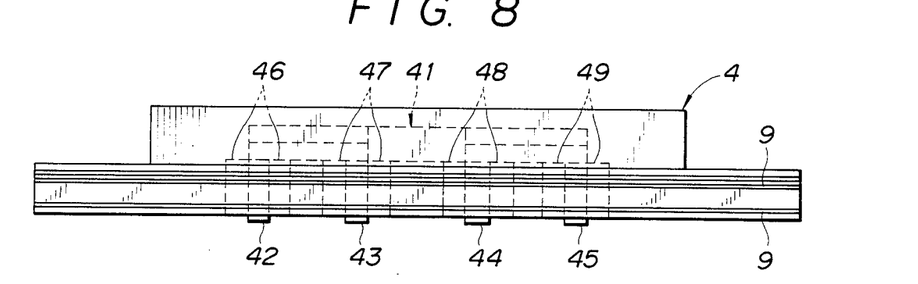
FIG. 8 is a side elevational view of the table body.
Figure 9:
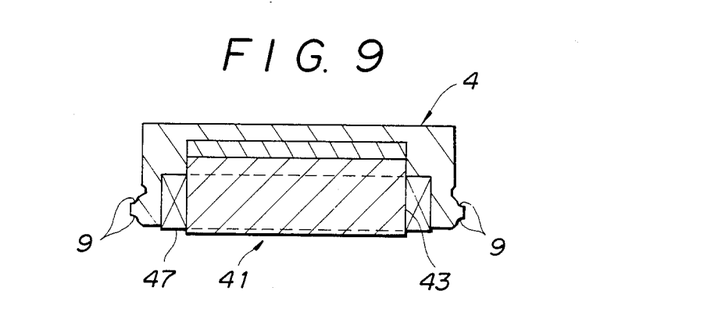
FIG. 9 is a sectional view taken along the line IX—IX of FIG. 7.
Figure 10:
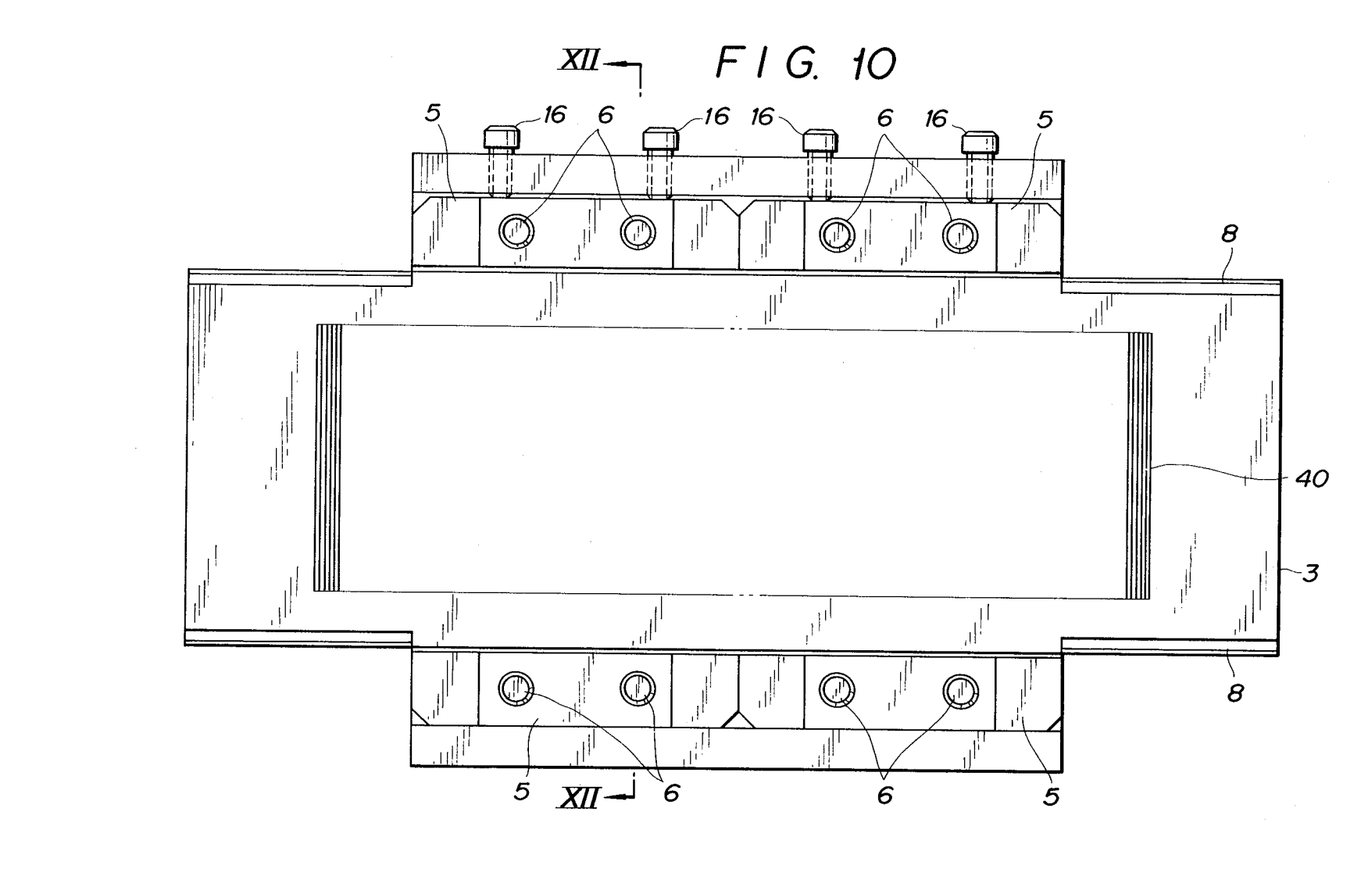
FIG. 10 is a plan view of an intermediate carriage incorporated in the embodiment, again rotated through an angle of 90° with respect to the illustration of FIG. 1.
Figure 11:
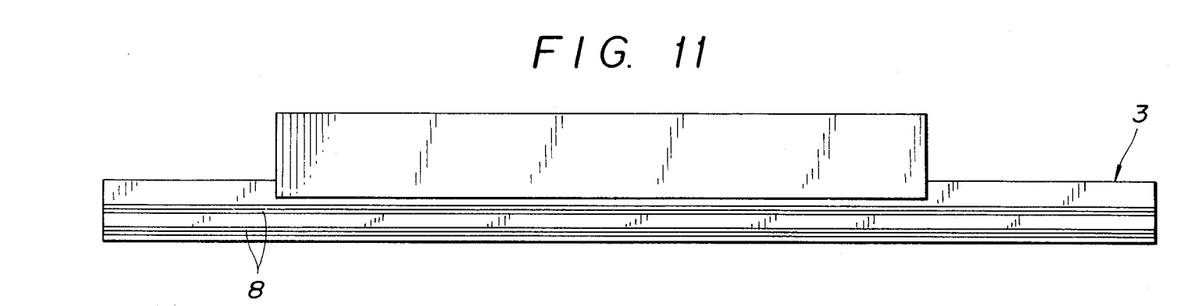
FIG. 11 is a side elevational view of the intermediate carriage.
Figure 12:
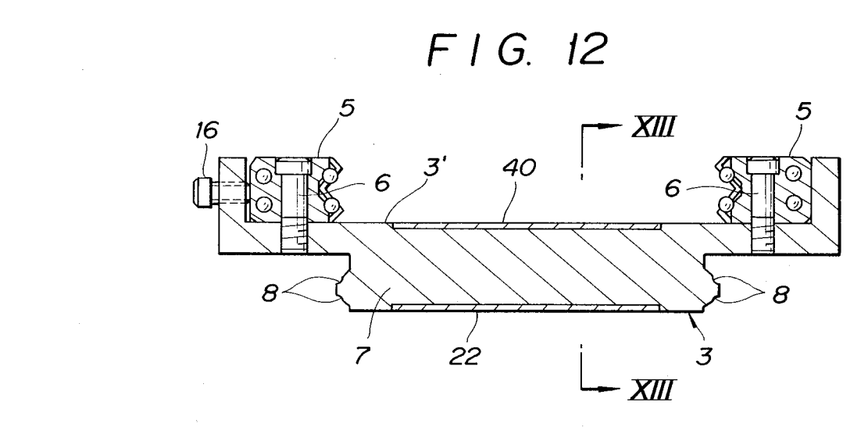
FIG. 12 is a sectional view taken along the line XII—XII of FIG. 10.

As will be seen from FIGS. 4 to 6, the base 1 has a substantially inverse U-shaped transverse cross section, and the pairs of linear bearings 2,2 and 2,2 are secured to the opposite walls of the recess 1', which are located on the inner surface of lateral portions of the base 1, by suitable fixing means 6,6 such as bolts. On the other hand, as will be seen from FIGS., 10 to 12, the intermediate carriage 3 has a substantially inverse U-shaped transverse cross section such that its lateral portions uprightly protrude therefrom. The underside surface of the intermediate carriage 3 is formed integrally with a protruding portion 7 which downwardly protrudes and longitudinally extends over the whole length of the carriage 3. Each of lateral portions of the protruding portion 7 is formed therein with a couple of loaded-ball rolling grooves 8,8 for guiding loaded balls 15 of the pairs of the linear bearings 2,2. The intermediate carriage 3 has the same transverse width as that of the base 1. Further, the pairs of linear bearings 5,5 and 5,5 for supporting the table body 4 are secured to the opposite walls of the recess 3' formed in the upper side surface of the intermediate carriage 3, which are located on the inner surface of lateral portions of the intermediate carriage 3, by suitable fixing means 6,6 such as bolts. As shown in FIGS. 7 to 9, the table body 4 superposedly supported on the intermediate carriage 3 has lateral side portions, each formed therein with a couple of loaded-ball rolling grooves 9,9 for guiding loaded balls 15 of the pairs of the linear bearings 5,5. The transverse width of the above-mentioned protruding portion 7 of the intermediate carriage 3 and that of the table body 4 are set values, equal to each other.

As stated above, the protruding portion 7 of the intermediate carriage 3 has both of its lateral end portions supported by the pairs of the linear bearings 2,2 and 2,2 secured to the base 1, while the table body 4 has both of its lateral end portions supported by the pairs of the linear bearings 5,5 and 5,5. Therefore, the table body 4 is mounted on the intermediate carriage 3, which is mounted on the base 1 in turn, in a structure which is highly rigid.

Figure 14:
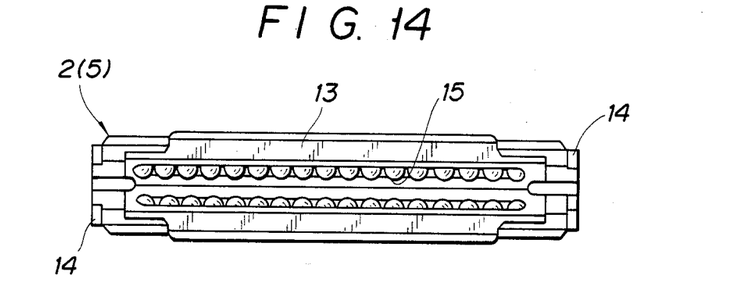
FIG. 14 is a front elevational view of a linear bearing incorporated in the embodiment.
Figure 15:
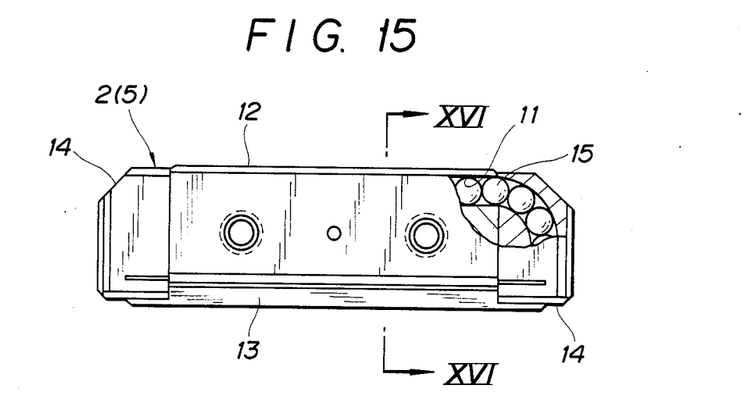
FIG. 15 is a partly-sectioned plan view of the linear bearing.
Figure 16:
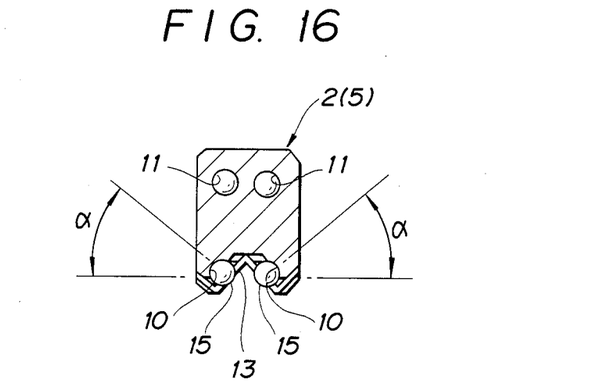
FIG. 16 is a sectional view taken along the line XVI—XVI of FIG. 15.

As shown in FIGS. 14 to 16, each of the linear bearings 2,5 comprises a bearing block 12 provided with two ball-rolling grooves 10, 10 on one end thereof and also with two internal ball-recirculating holes 11, 11; a retainer 13 which retains two loaded ball trains; and a pair of end plates 14, 14, each of which provides communication between the ball-rolling grooves 10, 10 and the corresponding ball-recirculating holes 11, 11 so as to allow the balls 15, 15 to roll and recirculate along endless passages formed by the ball-rolling grooves 10, 10 and the ball-recirculating holes 11, 11. In the illustrated embodiment, the angle of contact between the ball-rolling grooves 10, 10 and the loaded balls 15, 15 is about 45°.

As shown in FIG. 1, the linear bearings 2,2 are provided between the base 1 and the intermediate carriage 3, while the linear bearings 5,5 are provided between the intermediate carriage 3 and the table body 4. The clearances between the linear bearings 2,2 and the opposing surfaces of the protruding portion 7 of the intermediate carriage 3, as well as the clearance between the linear bearings 5,5 and the opposing surfaces of the table body 4, are adjustable by means of clearance-adjusting bolts 16, 16. Namely, as the clearance-adjusting bolts 16, 16 are tightened, the inner ends of these bolts press the adjacent bearings 2 and 5 towards the adjacent surfaces of the protruding portion 7 of the intermediate carriage 3 and the table body 4, respectively, while the reactional force acting on these bolts is transmitted through the intermediate carriage 3 and the table body 4 such as to press the other linear bearings 2 and 5 towards the other surfaces of the intermediate carriage 3 and the table body 4, thus suitably preloading the loaded balls 15, 15.

A first linear motor, generally designated at numeral 20, is provided between the base 1 and the intermediate carriage 3, while a second linear motor, generally designated at numeral 21, is provided between the intermediate carriage 3 and the table body 4. In the illustrated embodiments, each of the linear motors 20, 21 is a linear pulse motor which is constituted by a fixed member 22 and a movable member 23, and a fixed member 40 and a movable member 41, respectively, and adapted to operate in response to pulses inputted to the movable member 23, and the movable member 41, respectively, from a pulse generating means which is not shown.

The construction of the first linear motor 20 will be explained with specific reference to FIGS. 17 and 18. A fixed member 22 as the first fixed member is made of a magnetic material and has a flat tabular form. The fixed member 22 is secured to the underside of the intermediate carriage 3 such as to extend in the longitudinal direction thereof. On the other hand, a movable member 23 as the first movable member is secured to the upper side of the base 1, so as to oppose the fixed member 22. The movable member 23 has a central permanent magnet 24 and left and right magnetic cores 25 and 26 arranged to face each other across the central permanent magnet 24. The left magnetic core 25 has first and second magnetic poles which are magnetized in N polarity by the central permanent magnet 24. On the other hand, third and fourth magnetic poles 29 and 30 on the right magnetic core 26 are magnetized in S polarity.

Figure 17:
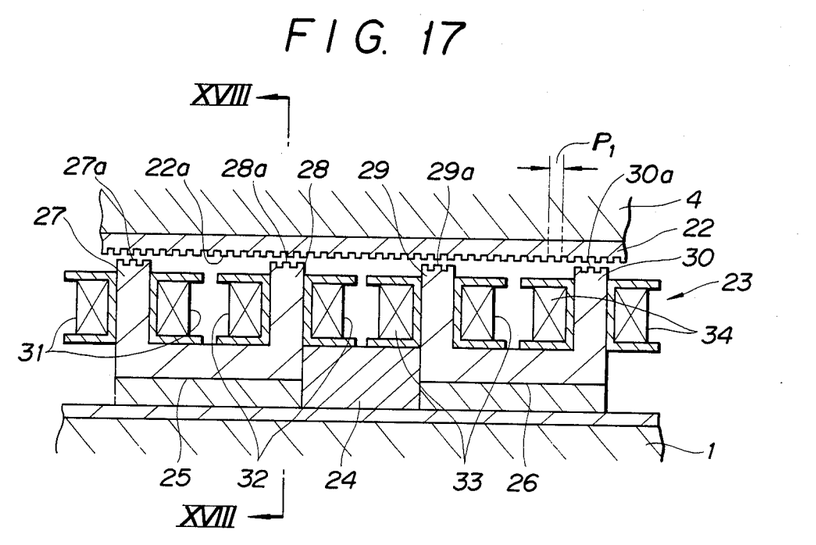
FIG. 17 is an enlarged sectional side elevational view of a first linear motor incorporated in the embodiment.
Figure 18:
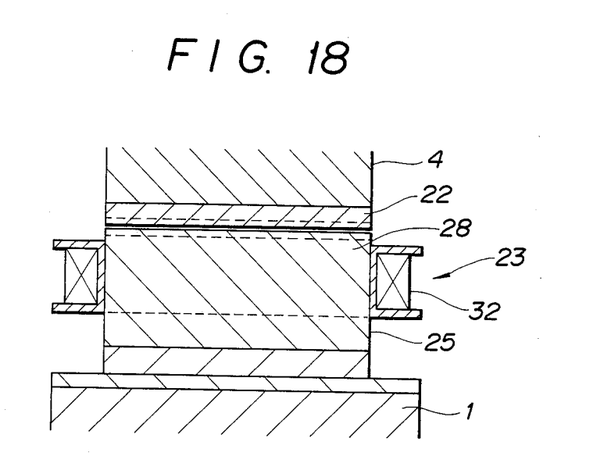
FIG. 18 is a sectional view taken along the line XVIII—XVIII of FIG. 17.

As shown in FIG. 17, a multiplicity of pole teeth 22a, each having a rectangular cross-section and extending in the direction substantially perpendicular to the longitudinal direction of the fixed member 22, are formed on the underside of the fixed member 22 over the entire length of the fixed member 22 at a constant pitch $P_1$. The first to fourth magnetic poles 27 to 30 are provided with pole teeth 27a to 30a at the same pitch as the pole teeth 22a on the fixed member 22. The first and second magnetic poles 27 and 28 of N polarity carry, respectively, first and second coils 31 and 32 wound thereon. These coils 31 and 32 are connected in series, such that they produce magnetic fluxes of counter-directions when electric pulse current is supplied to these coils from a pulse generating means (not shown) electrically connected to these coils 31, 32.

Similarly, the third and fourth magnetic poles 29 and 30 of S polarity carry, respectively, third and fourth coils 33 and 34 wound thereon. These coils 33 and 34 are connected in series, such that they produce magnetic fluxes of counter-directions when electric pulse current is supplied to these coils from the pulse generating means (not shown) electrically connected to these coils 33,34. For the purpose of simplification of explanation, it is assumed here that the phase of the pole teeth 28a of the second magnetic pole 28 is offset from the phase of the pole teeth 27a of the first magnetic pole 27 by an amount corresponding to $\frac{1}{2}$ pitch, i.e., $P_1/2$, and the phase of the pole teeth 29a of the third magnetic pole 29 is offset from the phase of the pole teeth 30a of the fourth magnetic pole 30 by an amount corresponding to $\frac{1}{2}$ pitch, i.e., $P_1/2$. It is assumed also that the pole teeth 29a, 30a of the third and fourth magnetic poles 29,30 of S polarity are offset in phase from the pole teeth 27a, 28a of the first and second magnetic poles 27, 28 of N polarity by an amount corresponding to $\frac{1}{4}$ pitch, i.e., $P_1/4$.

The principle of operation of the linear pulse motor incorporated in this embodiment will be explained with specific reference to FIGS. 19 to 22 which schematically illustrate the operation of this linear pulse motor.

The arrangement is such that the first and second coils 31 and 32 receive pulses through terminals a, while the third and fourth coils 33 and 34 receive pulses through terminals b. In a state shown in FIG. 19, the pulse current is supplied to the terminals a in such a direction as to excite the first magnetic pole 27. This state will be referred to as Mode (1), hereinunder. In another state shown in FIG. 20, the pulse current is supplied to the terminals b in such a direction as to excite the fourth magnetic pole 30 (Mode (2)). In still another state shown in FIG. 21, the pulse current is supplied to the terminals a in such a direction as to excite the second magnetic pole 28 (Mode (3)). Finally, in state shown in FIG. 22, the pulse current is supplied to the terminals b in such a direction as to excite the third magnetic pole 29 (Mode (4)).

The conditions of generation of magnetic force by each magnetic pole in Modes (1) to (4) are shown in Table 1 below.

TABLE 1

| Mode | Magnetic force generating conditions | | Stable position |
|---|---|---|---|
| (1) | First pole: | flux from magnet 24 + flux from first coil 31 | First pole |
| | Second pole: | flux from magnet 24 − flux from second coil 32 = 0 | |
| | Third and fourth poles: | magnetic forces by magnet 24 balanced | |
| (2) | First and second poles: | Magnetic forces by magnet 24 balanced | Fourth pole |
| | Third pole: | flux from magnet 24 − flux from third coil 33 = 0 | |
| | Fourth pole: | flux from magnet 24 + flux from fourth coil 34 | |
| (3) | First pole: | flux from magnet 24 − flux from first coil 31 = 0 | Second pole |
| | Second pole: | flux from magnet 24 + flux from second coil 32 | |
| | Third and fourth poles: | magnetic forces by magnet 24 balanced | |
| (4) | First and second poles: | magnetic forces by magnet 24 balanced | Third pole |
| | Third pole: | flux from magnet 24 + flux from third coil 33 | |
| | Fourth pole: | flux from magnet 24 − flux from fourth coil 34 | |

Figure 19:
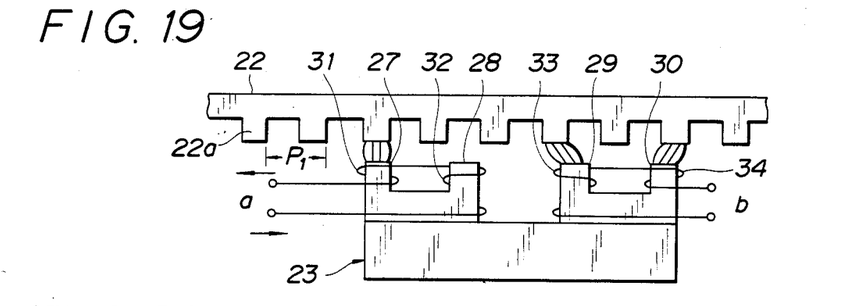
FIGS. 19 to 22 are views schematically illustrating the first linear motor, which are useful in explaining different steps of operation thereof.

As will be seen from Table 1, in Mode (1), the first magnetic pole 27 of N polarity exerts the strongest magnetic force, so that the movable member 23 is held in a stable state by the magnetic attraction force acting between the first magnetic pole 27 and the corresponding pole tooth of the fixed member 22. On the other hand, the third and fourth magnetic poles 29 and 30 of S polarity are offset by $\frac{1}{4}$ pitch from adjacent pole teeth 22a on the fixed member 22.

Figure 20:
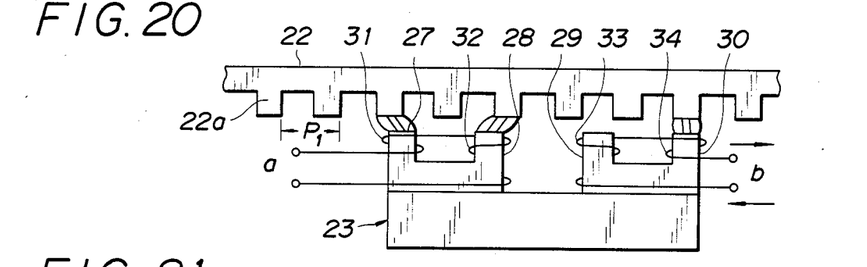

In Mode (2), the magnetic pole 27 does not produce force anymore and, instead, the fourth magnetic pole 30 of S polarity produces the strongest force, so that the movable member 23 is relatively moved by a distance corresponding to $\frac{1}{4}$ pitch, i.e., $P_1/4$, such that the fourth magnetic pole 30 comes into phase with the adjacent pole tooth 22a on the fixed member 22. Meanwhile, the first and second magnetic poles 27, 28 of N polarity are offset from the adjacent pole teeth 22a on the fixed member 22 by a distance corresponding to $\frac{1}{4}$ pitch, i.e., $P_1/4$.

Figure 21:
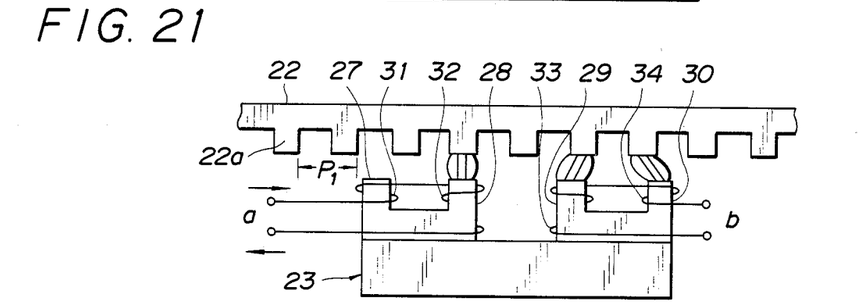

In Mode (3), the second magnetic pole 28 of N polarity produces the strongest magnetic force, so that the movable member 23 is relatively moved by a distance corresponding to $\frac{1}{4}$ pitch, i.e., $P_1/4$, such that the second magnetic pole 28 comes into phase with the adjacent pole tooth 22a on the fixed member 22. On the other hand, the third and fourth magnetic poles 29, 30 of S polarity are offset from the adjacent pole teeth 22a on the fixed member by a distance corresponding to $\frac{1}{4}$ pitch, i.e., $P_1/4$.

Figure 22:
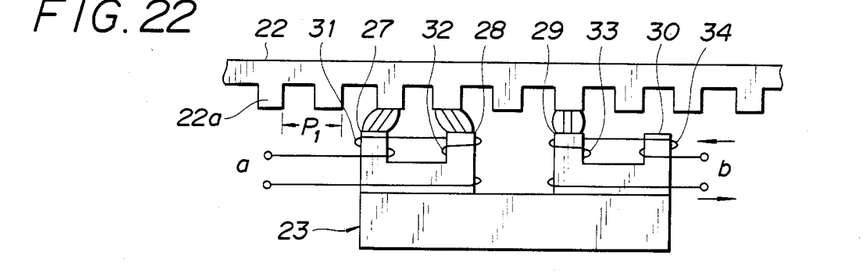

In Mode (4), the third magnetic pole 29 of S polarity exerts the strongest force so that the movable member 23 is relatively moved by a distance corresponding to $\frac{1}{4}$ pitch, i.e., $P_1/4$, such that the magnetic pole 29 comes into phase with the adjacent pole tooth 22a on the fixed member 22.

Thereafter, the operation proceeds in Mode (1) again so that the first magnetic pole 27 of N polarity comes to produce the strongest force. As a result, the movable member 23 is further moved by a distance correponding to ¼ pitch, i.e., $P_1/4$, thus resuming the state shown in FIG. 19. In this way, the movable member 23 travels a distance corresponding to ¼ pitch by sequential repetition of Modes (1) to (4).

The second linear motor 21, disposed between the intermediate carriage 3 and the table body 4, has a construction similar to that of the first linear motor explained hereinabove. Namely, as shown in FIGS. 1 to 3 and FIGS. 7 to 12, the second linear motor 21 has a flat tabular fixed member 40 as the second fixed member secured to the upper side of the intermediate carriage 3 such as to extend in the longitudinal direction thereof, and a movable member 41 the second movable member secured to the underside of the table body 4. As in the case of the movable member 23 of the first linear motor 20, the movable member 41 of the second linear motor 21 has a permanent magnet 41a, first and second magnetic poles 42 and 43 magnetized in N polarity by the permanent magnet 41a and third and fourth magnetic poles 44 and 45 magnetized in S polarity by the permanent magnet 41a. First, second, third and fourth coils 46, 47, 48 and 49 are wound on respective magnetic poles 42 to 45. The first coil 46, second coil 47, third coil 48 and the fourth coil 49 are electrically connected to the pulse generating means (not shown). In operation, the table body 4 is moved relatively with respect to the intermediate carriage 3 in the longitudinal direction of the base 1 in accordance with the pulses supplied from the pulse generating means.

Figure 13:
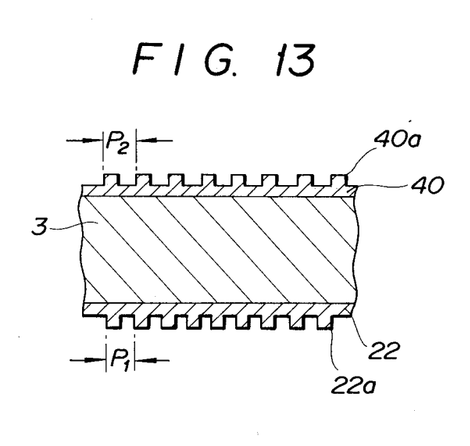
FIG. 13 is an enlarged sectional view taken along the line XIII—XIII of FIG. 12.

As will be seen from FIG. 13, the fixed member 40 of the second linear motor 21 secured to the upper side of the intermediate carriage 3 has pole teeth 40a formed at a constant pitch $P_2$ which is different from the pitch $P_1$ of the pole teeth 22a of the fixed member 22 of the first linear motor 20. For the simplification of explanation, an assumption is made also in the case of the second linear motor that the phase of the pole teeth on the second magnetic pole 43 is offset by an amount corresponding to ½ pitch, i.e., $P_2/2$, from the phase of the pole teeth on the first magnetic pole 42, while the phase of the pole teeth on the fourth magnetic pole 45 is offset by an amount corresponding to ½ pitch, i.e., $P_2/2$, from the phase of the teeth on the third magnetic pole 44.

It is assumed also that phases of the pole teeth on the third and fourth magnetic poles 44 and 45 of S polarity are offset from the phases of the first and second magnetic poles 42 and 43 of N polarity by an amount corresponding to ¼ pitch ($P_2/4$). Therefore, the movable member 41 can move a distance correponding to ¼ pitch, i.e., $P_2/4$, in response to each of successive pulses.

The operation of the embodiment of the linear motor-driven table apparatus will be explained hereinunder.

In the large-feed mode of operation, the table body 4 is moved at a large rate with respect to the base 1. For effecting the large-feed of the table body 4, pulses are inputted to the moving member 23 of the first linear motor 20 adjacent the base 1 from the pulse generating means (not shown) so that the movable member 23 moves with respect to the fixed member 22 on the lower side of the intermediate carriage 4 at a rate of ¼ pitch, i.e., $P_1/4$, per one pulse, so that the table body 4 travels together with the intermediate carriage 3 in the longitudinal direction at a rate of ¼ pitch, i.e., $P_1/4$, per one pulse, in the longitudinal direction of the base 1. Meanwhile, pulses are supplied from the pulse generating means (not shown) to the movable member 41 of the second linear motor 21 adjacent to the table body 4, in the reverse polarity to the pulses supplied to the first linear motor. In consequence, the movable member 41 moves with respect to the fixed member 40 on the upper side of the intermediate carriage 3 in the same direction as that of the movement of the first linear motor 20 at a rate of ¼ pitch, i.e., $P_2/4$, per one pulse. Namely, the second linear motor 21 drives the table body 4 with respect to the intermediate carriage 3 in the same direction as the driving by the first linear motor 20. In consequence, the table body 4 runs a distance $(P_1/4+P_2/4)$ relatively to the base 1 per one pulse, thus attaining the large-feed.

In a fine-feed mode of operation, the table body 4 is fed finely. This can be achieved by supplying pulse currents of the same polarity to the movable members 23 and 41 of the first and second linear motors 20 and 21. In this case, while the first linear motor 20 drives the table body 4 together with the intermediate carriage 3 in the longitudinal direction of the base 1 at the rate of ¼ pitch, i.e., $P_1/4$ per one pulse, the second linear motor 21 drives the table body 4 with respect to the intermediate carriage 3 at the rate of ¼ pitch, i.e., $P_2/4$, per one pulse, in the direction counter to the direction of feed by the first linear motor 20. Consequently, the first and second liner motors in combination feed the table body 4 with respect to the base 1 at a rate of $(P_1/4-P_2/4)$ per one pulse, thus effecting the fine feed of the table body 4.

The speed of feed of the table body 4 can be increased and decreased by increasing and decreasing the frequency of the pulses. The distance of travel is adjustable by varying the number of pulses inputted to the linear motors.

It will be understood that, since the linear bearings 2,2 . . . and 5,5 . . . are suitably preloaded, any backlash or play between the table body 4 and the intermediate carriage 3 and between the intermediate carriage 3 and the base 1 is avoided even when a load is applied to the table body 4. In addition, since the angle of contact between the loaded ball 15 and the ball-rolling grove 10 is selected to be about 45°, it is possible to bear the load equally in all directions, i.e., vertical and lateral directions, so that a constant clearance is maintained between the movable member and the fixed member of the linear motor, thereby assuring a constant propulsion force, as well as a constant fixing force. Thus, the linear bearings 2,2 . . . and 5,5 . . . employing rolling steel balls suffer from minimal wear so that there is no risk of interference between the movable member and the fixed member even when the table body 4 is loaded. This in turn permits the clearance between the movable member and the fixed member to be minimized, thus affording a large propulsion force during movement and a large fixing force upon stoppage.

In addition, since the table body 4 is supported at its both ends by linear bearings 2,2 . . . , 5,5 . . . , it exhibits a high rigidity so that any device carried by the table body 4 can be conveyed stably even when the device non-uniformly loads the table body 4 or even when any impact is applied to the table body 4. In addition, since the linear bearings 2,2 . . . , 5,5 . . . are provided on the intermediate carriage 3 and the base 1, the weights and, hence, the levels of inertia of the table body 4 and the intermediate carriage 3 are reduced correspondingly, thus improving the starting and stopping response characteristics.

Although the linear pulse motors of the described embodiment are arranged such as to feed the movable member with respect to the fixed member at a rate of ¼ pitch of the teeth per one pulse, this value of the feeding rate is not exclusive and any feed rate can be adopted provided that a constant feed per one pulse is obtained. It is to be understood also that the use of the linear pulse motor is only illustrative and other types of linear motor such as a linear D.C. motor, linear synchronous motor and so forth can be used equally well.

The linear motor-driven table apparatus of the invention, which has been described hereinbefore through specific embodiments, offers the following advantages.

First of all, it is to be understood that the table body and the intermediate carriage are moved lightly because the intermediate carriage is supported by the base through the intermediary of the linear bearings and because the table body is supported by the intermediate carriage through the intermediary of linear bearings. It is to be noted also that the use of linear motors eliminated the necessity of the ball screw and nut assembly and the spline assembly, so that the weight and hence the inertia of the movable part such as the table body is reduced so as to enhance the starting and stopping characteristics, thus attaining a remarkable improvement in the precision of positioning of the table body.

Furthermore, since the table body is supported at both ends by the linear bearings, it exhibits a high rigidity so that the table can be stably fed even when it is loaded non-uniformly or even when an impact is applied thereto. At the same time, a higher positioning precision is ensured also by the elimination of the twisting of shafts, such as the ball screw and the backlash between the screw shaft and the nut, which are inevitable in the known apparatus.

Furthermore, the amounts of feed in the fine-feed mode and the large-feed mode can be varied as desired by suitably selecting the difference between the pitch of the teeth on the fixed member of the linear motor disposed between the base and the intermediate carriage and the pitch of the teeth of the fixed member of the linear motor disposed between the intermediate carriage and the table body.

In addition, the thickness of the whole apparatus is reduced and the construction is made compact so as to widen the application of the table apparatus, by virtue of the elimination of the rotary motor, screw shaft and nut assembly and the apline assembly. For the same reason, the number of parts is decreased, to reduce the production cost while assuring higher precision of assembly, and the risk of occurrence of faults is minimized thanks to the simplified construction.

Although the invention has been described through specific terms, it will be clear to those skilled in the art that the described embodiments are only illustrative and various changes and modifications may be imparted thereto without departing from the scope of the invention which is limited solely by the appended claim.

What is claimed is:

1. A linear motor-driven table apparatus capable of operating both in a fine-feed mode and large-feed mode, comprising:

a base having an upper surface with a recess in said surface extending in a longitudinal direction over its entire length;

first linear bearing means, said first linear bearing means including individual bearing units secured in said recess on opposite walls facing one another, said bearing units extending parallel along said recess and provided with first ball rolling grooves on the facing sides away from said walls;

a carriage having a surface on the side away from said base with a recess in said surface extending in said longitudinal direction over its entire length, said carriage mounted on said base by said first linear bearing means and movable in said longitudinal direction, said carriage also provided with first ball rolling grooves on opposite side surfaces, said ball rolling grooves of said first side surfaces facing said ball rolling grooves of said first linear bearing means;

first rolling ball elements rolling through passages formed by said first ball rolling grooves in said first linear bearing means and said carriage, respectively such that the angle of contact between the rolling balls and each of the first ball rolling grooves is substantially 45° with respect to the horizontal plane;

second linear bearing means, said second linear bearing means also including individual bearing units secured in said carriage recess on opposite walls facing one another, said bearing units extending parallel along said recess and provided with second ball rolling grooves on the facing sides away from said walls;

a table mounted by said second bearing means and movable relative to said carriage in the same or opposite direction of the movement, said table also provided with second ball rolling grooves on opposite side surfaces, said second ball rolling grooves of said side surfaces facing said ball rolling grooves of said second linear bearing means;

second rolling ball elements rolling through passages formed by said second ball rolling grooves in said table and said second linear bearing means, respectively such that the angle of contact between the rolling balls and each of the second ball rolling grooves is substantially 45° with respect to the horizontal plane;

a first linear motor means acting between said base and said carriage, said first linear motor including a first fixed member secured to a lower surface of said intermediate carriage and extending in the longitudinal direction thereof, and a first movable member secured to said upper surface of said base in position opposite said first fixed member; and a second linear motor means acting between said carriage and said table, said second linear motor including a second fixed member secured to an upper surface of said carriage and extending in the longitudinal direction thereof, and a second movable member secured to a lower surface of said table in position opposite said second fixed member, said first fixed member having teeth arranged at a pitch different from the pitch of teeth of said second fixed member.

* * * * *